United States Patent [19]

Page et al.

[11] 4,399,598

[45] Aug. 23, 1983

[54] CERAMIC ROLLS WITH METAL END CAPS

[75] Inventors: Joseph V. Page, Oakdale; Henry P. Hanneken, Pittsburgh, both of Pa.

[73] Assignee: PPG Industries, Inc., Pittsburgh, Pa.

[21] Appl. No.: 241,429

[22] Filed: Apr. 6, 1981

[51] Int. Cl.³ ............................................. B21B 31/00
[52] U.S. Cl. ........................................ 29/115; 29/123
[58] Field of Search .................. 29/115, 123; 403/292, 403/297, 298; 432/246

[56] References Cited

U.S. PATENT DOCUMENTS

| | | | |
|---|---|---|---|
| 2,931,412 | 4/1960 | Wing | 403/243 X |
| 2,950,097 | 8/1960 | Tohir | 432/246 |
| 3,867,748 | 2/1975 | Miller | 432/246 |
| 4,131,420 | 12/1978 | Miller | 246/4,140,486 |
| 4,140,486 | 2/1979 | Nitschke | 432/246 |
| 4,242,782 | 1/1981 | Hanneken et al. | 29/129 |
| 4,247,000 | 1/1981 | Marriott, Jr. et al. | 198/780 |
| 4,306,838 | 12/1981 | Trainer | 403/298 X |

*Primary Examiner*—Eugene F. Desmond
*Attorney, Agent, or Firm*—Edward I. Mates

[57] ABSTRACT

A ceramic roll for transporting glass sheets for thermal treatment is drivingly connected to a drive shaft through a metal end cap using one or more circumferentially expandable, radially compressible, split metal rings that wedge into the circumferential space between the end portion of the roll and the inner surface of the metal end cap. The metal end cap is of uniform diameter throughout its axial length that surrounds the end of the roll. This construction is cheaper to fabricate than prior art metal end cap constructions of more complicated structure.

10 Claims, 3 Drawing Figures

CERAMIC ROLLS WITH METAL END CAPS

BACKGROUND OF THE INVENTION

1. Field of the Invention

The present invention relates to frangible, ceramic conveyor rolls designed for use in the heat treatment of glass sheets wherein the rolls are rotated to transport a series of glass sheets through a hot enclosed atmosphere. The present invention also relates to a tunnel-like furnace provided with rolls of special construction according to the present invention.

Furnaces for tempering or annealing glass sheets conventionally include conveyors which carry the glass sheets through an enclosed atmosphere of high temperature during the annealing or tempering of the glass. A so-called roller hearth type of conveyor utilized to carry glass sheets includes horizontally extending conveyor rolls of ceramic material upon which heated glass sheets are rotatably supported. When the conveyor rolls rotate, the glass sheets are driven by friction over the rolls through the enclosed furnace atmosphere of high temperature.

One ceramic material used for cylindrically shaped rolls for a roller hearth is a sintered, fused silica material that is made by grinding solid fused silica into small particles and then sintering these particles to each other at a temperature below the fusing temperature. Such a material is readily formed into an elongated shape required for the rolls of the roller hearth. In addition, fused silica rolls so formed have a relatively small coefficient of thermal expansion. This latter characteristic is extremely desirable because the rolls are subjected to extremely high temperatures in one portion of the roller hearth and relatively low temperatures in another portion of the roller hearth.

One conventional way for rotatively supporting and driving conveyor rolls of fused silica and other like ceramic compositions utilizes bearings that support the opposite end portions of the rolls in the roller hearth. A drive member having a toothed drive component such as a gear or a chain sprocket drives the roll at one end. A metallic end cap rotatable with a driven shaft is conventionally used to transmit the drive from the drive gear or chain sprocket to the end of the ceramic roll.

Rolls of ceramic composition are superior to metal rolls in high temperature environments for several reasons. First of all, ceramic rolls have a relatively small coefficient of thermal expansion compared to that of metal rolls. Consequently, ceramic rolls are less likely to warp in response to a change of temperature. Ceramic rolls are also less likely to oxidize, flake off and develop pock marking on their glass engaging surface. However, ceramic materials are difficult to work with and are quite fragile. Furthermore, such rolls composed of ceramic material cannot be connected directly to the drive mechanisms needed to rotate the rolls. The use of metal end caps with ceramic rolls for roller hearths has been developed to a certain extent. However, they introduced problems of securing the metallic end caps to the ends of the ceramic rolls that they drive in transmitting a torque from the driving mechanism.

One method of securing involves an adhesive bond between the metal end cap and the end of the ceramic roll. Another method involves shrinking the metallic end cap onto the roll end by heat shrinkage. Still another method involves the use of O-rings of elastomeric material such as natural or synthetic rubber received within a circumferential groove extending around the inner surface of the cylindrical metal end cap. The O-ring is received within the groove in position to provide a frictional force sufficient to transmit a torque from the metal driving shaft through the cylindrically shaped metal end cap to the ceramic roll without undue wear of the roll, the O-ring or the metal cylindrical end cap. It has also been suggested to use a composite metal end cap in conjunction with a ceramic roll which comprises a flexible metal inner end cap member adapted for mounting in direct contact over an end of the ceramic roll and a rigid metal outer end cap member adapted for mounting over the inner end cap member and means for moving the outer end cap member axially relative to the inner end cap member so as to increase radial clamping of the flexible metal inner end cap member against the ceramic roll on axially inward motion of the rigid, outer end cap member.

All of these method have drawbacks. Adhesives presently known require an extended cure period of at least about 24 hours before the ceramic roll is securely fixed to its end cap. Such a delay is too long to accept for mass production operations. Furthermore, it is difficult to separate a metal end cap from the end of a ceramic roll that is adhered thereto when roll replacement is necessary.

Heat shrinking requires heating the metallic end cap to a very high temperature so that its diameter increases to enable it to be shrunk fit over the end of the ceramic roll. The internal diameter of the end cap and the outer diameter of the ceramic roll must be closely matched so that the end of the roll is small enough to be inserted into the heated end cap but large enough to be securely clamped after cooling. Often it is necessary to machine one or both of the matching parts in order to provide suitable matching. At the inner end of the metallic end cap, the ceramic roll is subjected to a clamping pressure due to the heat shrinking of the metal end cap. Adjacent to this portion of the ceramic roll subjected to the clamping pressure is an adjacent portion free of the clamping pressure. At this location of the boundary between a high clamping pressure and low clamping pressure, ceramic rolls are subject to fracture due to the high stress gradients involved.

The use of O-rings requires that the metal end caps be grooved circumferentially to receive the O-rings. Such machining is expensive. Furthermore, while it is possible to use ceramic rolls having O-rings providing frictional engagement with a metal end cap exterior to the furnace wall, the upper temperature limits to which the rolls and metal end caps can be exposed are limited to the temperature at which the material of which the O-rings are composed can withstand. While these temperatures are relatively high, further improvement would be desirable.

Making the metal end caps of the composite construction of a rigid outer member and a flexible machined inner member requires the use of several members for each end cap, each of which members have to be machined separately. It would be much better to develop a construction that utilizes a metal end cap of a construction that does not require complicated machining.

2. Description of Patents of Interest

U.S. Pat. No. 3,867,748 to Miller discloses the use of an adhesive for securing metal end caps to the ends of cylindrical ceramic conveying rollers in a roller hearth.

The rolls cannot be used until the adhesive is cured. Since curing is a slow process, such rolls are not practical for rapid installation for high speed production operations. Furthermore, the end caps are vented to provide escape for excess adhesive, thereby complicating the end cap fabrication process.

U.S. Pat. No. 4,131,420 to Miller utilizes a two piece coupling that disconnects a ceramic roll including its end cap from the drive train which provides a rotating force to the end cap of the ceramic roll. The end cap in this patented apparatus is attached to the ceramic roll using an adhesive in a manner similar to that of the previous patent.

U.S. Pat. No. 4,140,486 to Nitschke utilizes a metallic spring end cap for rotatably driving a glass conveyor roll of ceramic material using helical spring coils that have a diameter in an undeflected condition slightly less than the diameter of the end of the ceramic roll so that coil deflection that increases the coil diameter allows the coils to be mounted over the end of the ceramic roll. A subsequent release clamps the coils over the end of the roll. The helical spring coil may be engaged by friction or by tooth sprocket gear driven rolls to transmit a force thereto.

U.S. Pat. No. 4,242,782 to Hanneken and Marriott discloses a ceramic roll for transporting glass sheets for thermal treatment in which a metal end cap is circumferentially grooved to receive a hard rubber O-ring that provides frictional engagement between the metal end cap and an end of the ceramic roll. While the metal end cap is constructed and arranged to facilitate its mounting on and removal from the end of the ceramic roll, it would be desirable to avoid the need for circumferentially grooving a cylindrical metal end cap.

U.S. Pat. No. 4,247,000 to Marriott and Imler discloses a composite metal end cap for use with a ceramic roll in which the end cap comprises a flexible metal inner end cap member adapted for mounting in direct contact over an end of the ceramic roll and a rigid metal outer end cap member adapted for mounting over the inner end cap member. The inner end cap member is constructed and arranged to flex radially inwardly in at least its axially inner end to provide a clamping force against the end of the ceramic roll when the outer member moves axially inwardly. It would be desirable to provide a metal end cap construction that is less complicated in structure.

SUMMARY OF THE INVENTION

The present invention relates to a glass sheet conveyor roll of ceramic composition having an axially elongated, substantially cylindrical shape, shafts located in alignment with the ends of the roll, and novel means for drivingly connecting at least one of the shafts to the roll. The novel means comprises a metal end cap having a cylindrical inner surface of uniform diameter along the axial length of the end cap rotatable with one of the shafts, the inner surface having a diameter slightly larger than the diameter of the roll at the corresponding end of the roll. A split, circumferentially expandable, radially compressible metal ring, having a pair of axially outer rims interconnected by an intermediate portion comprising axially extending, circumferentially spaced corrugations whose unstressed radial height is slightly greater than the difference in radius between the end portions of the roll and the inner surface of the metal end cap when the ring is unstressed, is wedged between the inner cylindrical surface of the metal end cap and the outer circumferential surface of the corresponding end portion of the roll to compress the corrugations radially and provide a tight coupling between the inner cylindrical surface of the metal end cap and the outer surface of the corresponding end portion of the roll. Such wedging by one or more rings at each end of the roll makes it unnecessary to machine any grooves in the inner wall of the metal and caps, a costly fabrication operation. The split rings may be corrugated along their entire axial length in an alternate embodiment.

While such split rings have been used as wedging shims between two metal members of cylindrical configuration, and typical applications thereof include holding antifriction and plain bearings, bobbins, cams, couplings, fans, gears, impellers, knobs, pulleys, pins, spacers and wheels within metal housings, it is believed that such split rings have never been used prior to the present invention to form a tight fit between a metal end cap and a ceramic roll for the purpose of transmitting torque therebetween. It is believed that the reason for failing to provide such a combination in the past has been the result of a prejudice on the part of the glass treating art that the use of any metal material in pressurized engagement against a ceramic surface would damage the ceramic surface to the point that the ceramic roll would be rendered unfit for service after a relatively short period of operation.

Unexpectedly, and surprisingly, ceramic rolls having ends wedged to cylindrical metal end caps by split rings of the type used with ceramic rolls as taught by this invention have been used experimentally under production conditions in roller hearth conveyors where other rolls have also been employed and have proven to be capable of operating more than one year without requiring replacement. Therefore, the conveyor rolls of the present invention are especially suitable for use in a tunnel-like furnace enclosing a high temperature region suitable for processing glass sheets to be tempered.

The benefits of the present invention will be understood much better in the light of a description of a specific embodiment of this invention which follows.

BRIEF DESCRIPTION OF THE DRAWINGS

In the drawings that form part of a description of the present invention and wherein like reference numbers refer to like structural parts.

DESCRIPTION OF THE PREFERRED EMBODIMENT

Figure 1:
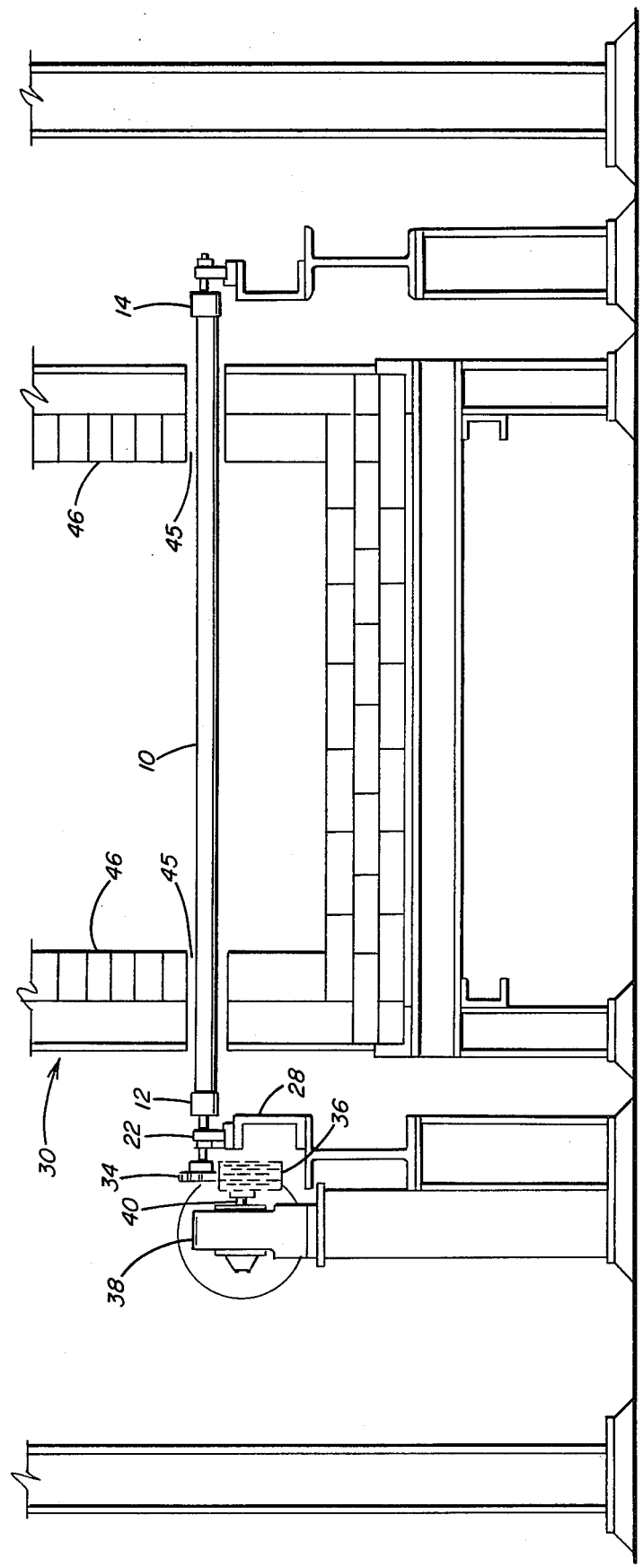
FIG. 1 is a transverse elevational view of a single conveyor roll modified according to the present invention showing how it is installed in a typical roller hearth furnace.
Figure 3:
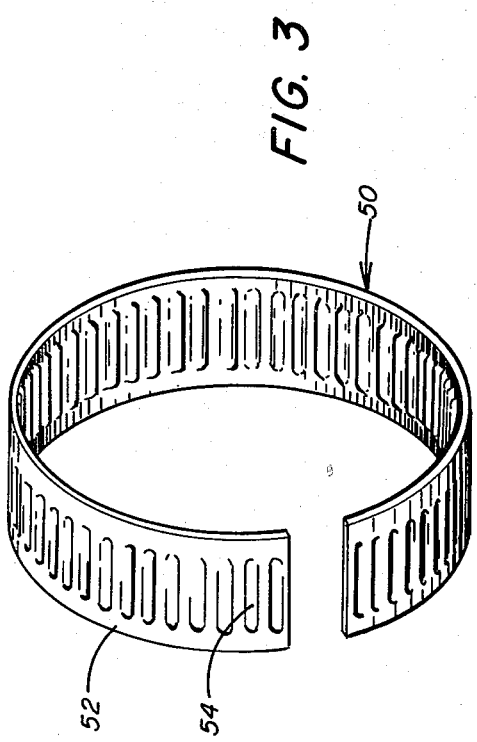
FIG. 3 is a perspective view of a split, circumferentially expandable, radially compressible metal ring that forms an important part of the present invention.
Figure 2:
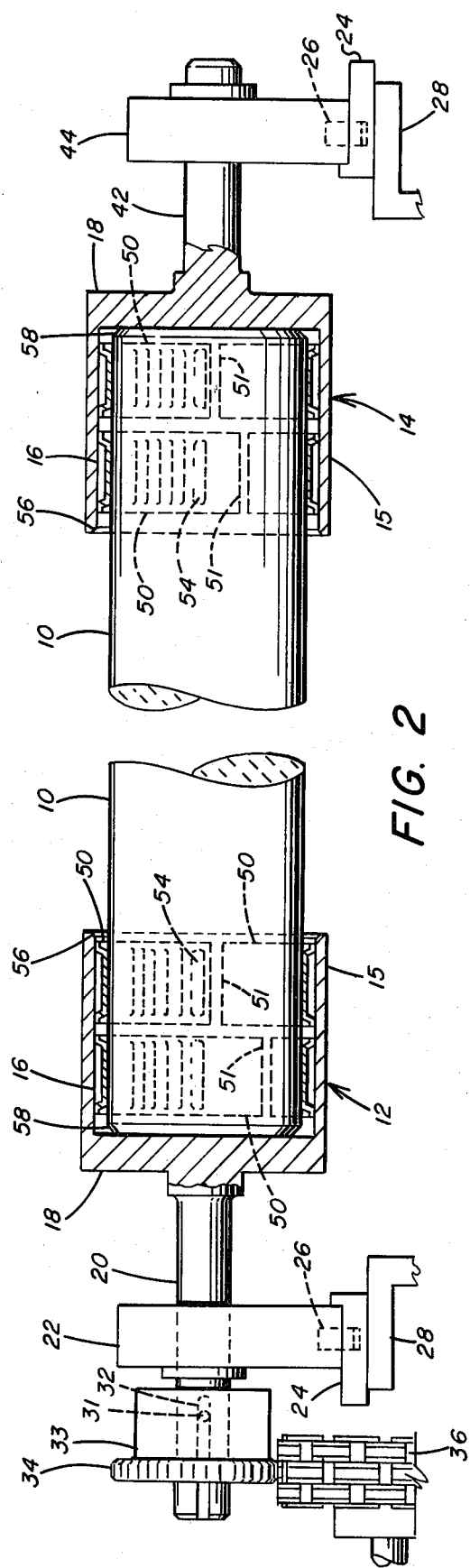
FIG. 2 is an enlarged fragmentary view showing the opposite end portions of the ceramic roll of FIG. 1 with the center portion omitted to show the details of the present invention on a larger scale.

Referring to the drawings, FIGS. 1 and 2 disclose a ceramic roll 10 of an axially elongated, cylindrical shape extending between a pair of metal end caps 12 and 14. The metal end caps 12 and 14 have a cylindrical inner housing 15 having a smooth inner surface 16 of constant diameter throughout essentially its entire axial length, a base member 18 from which the housing 15 extends axially inward an a drive shaft 20 extending axially outward from the base member 18 of the metal end cap 12 in axial alignment with the ceramic roll 10. The base member 18 serves as a head for the metal end cap 12 or 14.

The drive shaft 20 extends through a bearing housing 22. The latter is one of several bearing housings that are supported on a horizontally extending angle member 24. Each bearing housing 22 is fixed in position relative to the angle member 24 through an alignment pin 26. The angle member 24 is supported on a support structure 28 disposed to one side of a tunnel-like furnace 30 across which a plurality of the ceramic rolls 10 are installed in longitudinally spaced relation along the length of the furnace. Drive shaft 20 has a key 31 that meshes with an axial keyway 32 in a rotatable housing 33 fixed for rotation with a sprocket wheel 34. The latter is driven by a drive chain 36 upon which it rests. The drive chain, in turn, is driven off a drive motor 38 through a drive shaft 40.

The other metal end cap 14 likewise comprises a cylindrical inner member 15 having a smooth inner surface 16. A base member 18 is connected to the axially outer end of the cylindrical inner member 15 and extends to form a stub shaft 42 aligned axially with the drive shaft 20. A bearing housing 44 supports the free end of the stub shaft 42. The bearing housing 44 is supported on the opposite side of the furnace 30 from the occupied by the bearing housing 22 in a similar manner of support that has a horizontally extending angle member 24, an alignment pin 26, and a support structure 28. The roll 10 extends through openings 45 in the opposite side walls 46 of the furnace 30 and the metal end caps are located laterally exterior of the opposite side walls.

A split metal ring 50 is wedged between the outer circumferential surface of each end portion of the ceramic roll 10 and the inner surface 16 of the cylindrical member 15 of each of the metal end caps 12 and 14 to provide a strong frictional coupling between the metal end cap 12 and one end of the ceramic roll 10 and between the other end of the ceramic roll 10 and the outer metal end cap 14 so as to enable the two metal end caps to rotate in unison with the ceramic roll 10. The split ring 50 is preferably composed of spring steel and comprises circumferential, axially outer rib portions 52 interconnected by a central portion containing a plurality of circumferentially spaced, axially extending corrugations 54. The split ring 50 has a circumferential length slightly less than the circumference of the outer end of the ceramic roll to which it is applied so that when it is placed in surrounding relation about said end portion and wedged between the end portion of a ceramic roll and a metal end cap so that it compresses radially and expands circumferentially, a gap 51 of approximately 1/16 inch (1.6 millimeters) circumferential length remains.

Split corrugated open rings of hardened steel having straight rims at the end of the corrugations are available commercially as STAR tolerance rings, which are sold for use as wedging shims between two metal cylindrical members. For providing a wedging shim between a ceramic roll 2½ inches (6.35 centimeters) in diameter and an end cap having a cylindrical bore of 2.595 inches (6.59 centimeters) in diameter, STAR tolerance rings of type AN 250 125-F have been used. These rings have a nominal diameter of 2½ inches (6.35 centimeters) and are 1¼ inches (3.175 centimeters) wide. The unstressed thickness of the rings is approximately 0.05 inches (0.13 centimeters) and comprises thin metal sheeting having a thickness of approximately 0.010 inches (0.025 centimeters) with a depth of corrugation of approximately 0.030 inches (0.076 centimeters). Preferably, a pair of split rings of this size is provided between each end portion of the ceramic roll 10 and each metal end cap 12 or 14. The split rings are axially spaced from one another to spread the stress applied to the end portions of the roll over as long a length as possible. Spacing the split rings axially also provides better axial alignment between the metal end cap and the end portion of the roll that it surrounds.

In order to install a pair of split metal rings 50 in the space between a metal end cap 12 or 14 and the end of a ceramic roll 10 of the dimensions specified, the inner end of the cylindrical inner member 15 of each metal end cap is chamfered at 56 to facilitate insertion of the ceramic roll with a pair of split metal rings surrounding the end portion of the roll. A clamp is provided at a distance from the end of the roll approximating the axial length of the metal end cap. The corrugations compress radially as the ceramic roll is forced into the metal end caps and the circumferential length of the corrugated metal ring increases somewhat but not sufficiently to close the gap between the split ends of each ring.

Two ceramic rolls of the type just described have been used experimentally in a production operation for more than one year with no indication of any problem of wear. The metal end caps for these rolls comprised cylindrical members 3 inches (7.62 centimeters) long and each metal end cap was wedged to an end of the ceramic roll using two split metal rings 50 of the type described to wedge each metal end cap against an end of the roll to form a firm bond which resisted slippage during use at the hot end of a roller hearth furnace used to process glass sheets. The split rings were spaced ⅛ inch (3.2 millimeters) apart and were approximately centrally disposed relative to the axial dimension of the cylindrical members 15.

The ends of the ceramic roll are also preferably chamfered at 58. The chamfered ends facilitate slipping the expandable metal rings thereon. In addition, chamfering reduces the tendency of the rolls to develop damage at their ends.

It is understood that the present invention is not limited for use with 2½ inch (6.35 centimeters) diameter rolls, but can be used with different size rolls. Generally a larger diameter roll requires a larger tolerance between the outer diameter of the roll and the inner diameter of the cylindrical housing of the metal end cap. The split metal ring may be corrugated more deeply in order to provide the ring with more distortion ability and provide the frictional force between the end of the roll and the inner cylindrical surface of the metal end cap. While two split rings of the size and spacing indicated previously worked well, it is understood that the number, the width and the spacing between split rings may be varied without departing from the present invention.

It is noted that the split rings tend to be more frictionally bonded to the ceramic roll than the metallic end cap. Therefore, even though the unstressed thickness of the corrugated split ring is greater than the spacing between the outer surface of the roll and the inner surface of the cylindrical member of the metal end cap, the split ring slides axially with the roll relative to the metal end cap when forcing the end of the ceramic roll and its split rings into a metal end cap because the split rings have a lower coefficient of friction relative to the metal end cap than relative to the ceramic roll.

As an alternate embodiment of this invention, the split rings used may be corrugated throughout their axial length. Either embodiment is readily assembled or disassembled about an end of a ceramic roll and can be reused whenever a ceramic roll is damaged to the extent that it requires replacement.

The form of the invention shown and described in this specification represents an illustrative preferred embodiment thereof. It is understood that various changes may be made without departing from the gist of the invention as defined in the claimed subject matter that follows.

We claim:

1. For use with heated furnaces, a glass sheet conveyor roll of fused silica composition having an axially elongated, substantially cylindrical shape including an intermediate portion of round cross-section for conveying glass sheets for thermal treatment, shafts located in alignment with the ends of said roll, and means for drivingly connecting at least one of said shafts to said roll, said means comprising a metal end cap having a cylindrical inner surface rotatable with one of said shafts, said inner surface having a diameter slightly larger than the diameter of said roll at the corresponding end of said roll, and wedging means interposed between said inner surface and said roll comprising a split, circumferentially expandable and radially compressible metal ring having axially extending corrugations, the unstressed radial height of said ring being slightly greater than the difference in radius between the end portion of said roll and the inner surface of said metal end cap when said ring is unstressed, said ring being interposed between said inner cylindrical surface of said metal end cap and the corresponding end portion of said roll to compress said corrugations radially and provide a tight coupling between said inner cylindrical surface of said metal end cap and the outer surface of said corresponding end portion of said roll.

2. A glass sheet conveyor roll as in claim 1, wherein said wedging means comprises a pair of said split expandable metal rings wedged between said metal end cap and the corresponding end portion of said roll, said rings being axially spaced from one another.

3. A glass sheet conveyor roll as in claim 1, wherein said split ring has a circumferential length that is less than the circumference of said end portion of said roll to provide a short circumferentially extending gap between the ends of said split ring when it is compressed radially and expanded circumferentially.

4. A glass sheet conveying roll as in claim 1, wherein said roll is chamfered at its end to facilitate relative sliding between said ceramic roll and said metal end cap in an axial direction when said split ring is disposed about the end portion of said roll.

5. A glass sheet conveying roll as in claim 1, wherein said metal end cap has an open inner end that is chamfered to facilitate entry of said ceramic roll within said metal end cap in an axial direction when said split ring is disposed about the end portion of said roll.

6. A glass sheet conveying roll as in claim 1, having an end cap and wedging means comprising a split, circumferentially expandable radially compressible metal ring similar to said first ring disposed about the other end portion of said conveyor roll in a manner similar to that of claim 1.

7. A glass sheet conveying roll as in claim 2, having an end cap and wedging means comprising a pair of split, circumferentially expandable radially compressible metal rings similar to those of said first pair disposed about the other end portion of said conveyor roll in a manner similar to that of claim 2.

8. A glass sheet conveyor roll as in claim 1, wherein said axially extending corrugations are located in an axially intermediate portion of said ring flanked by axially outer rims.

9. A conveyor for conveying glass sheets through a tunnel-like furnace having a relatively hot furnace portion comprising a plurality of longitudinally spaced, transversely extending conveyor rolls, a plurality of said conveyor rolls in said hot furnace portion being of fused silica composition having an axially elongated, substantially cylindrical shape including an intermediate portion of round cross-section for conveying glass sheets for thermal treatment, shafts located in alignment with the ends of each said roll, and means for drivingly connecting at least one of said shafts to said roll, said means comprising a metal end cap having a cylindrical inner surface rotatable with one of said shafts, said inner surface having a diameter slightly larger than the diameter of said roll at the corresponding end of said roll, and wedging means interposed between said inner surface and said roll comprising a split, circumferentially expandable and radially compressible metal ring having axially extending corrugations, the unstressed radial height of said ring being slightly greater than the difference in radius between the end portion of said roll and the inner surface of said metal end cap when said ring is unstressed, said ring being interposed between said inner cylindrical surface of said metal end cap and the corresponding end portion of said roll to compress said corrugations radially and provide a tight coupling between said inner cylindrical surface of said metal end cap and the outer surface of said corresponding end portion of said roll.

10. A conveyor as in claim 9, wherein said axially extending corrugations are located in an axially intermediate portion of said ring flanked by axially outer rims.

* * * * *